United States Patent [19]

Yamamoto et al.

[11] Patent Number: 4,611,402
[45] Date of Patent: Sep. 16, 1986

[54] DIGITAL TAPE MEASURE

[75] Inventors: Nobuyuki Yamamoto; Tatsuaki Nakai, both of Kyoto, Japan

[73] Assignee: Kyoto Measuring Instruments Corp., Kyoto, Japan

[21] Appl. No.: 793,659

[22] Filed: Oct. 31, 1985

[30] Foreign Application Priority Data

Jan. 18, 1985 [JP] Japan .................. 60-008100

[51] Int. Cl.$^4$ .......................... G01B 3/10
[52] U.S. Cl. ................................ 33/139
[58] Field of Search ........... 33/125 C, 138, 139, 33/140

[56] References Cited

U.S. PATENT DOCUMENTS

| | | | |
|---|---|---|---|
| 4,161,781 | 7/1979 | Hildebrandt et al. | 33/140 |
| 4,164,816 | 8/1979 | Bergkvist | 33/139 |
| 4,195,348 | 3/1980 | Kakutani | 33/140 |
| 4,366,623 | 1/1983 | Bergqvist | 33/140 |

FOREIGN PATENT DOCUMENTS

| | | | |
|---|---|---|---|
| 112505 | 8/1980 | Japan | 33/138 |
| 122104 | 9/1980 | Japan | 33/138 |

*Primary Examiner*—Richard R. Stearns
*Attorney, Agent, or Firm*—Brumbaugh, Graves, Donohue & Raymond

[57] ABSTRACT

A digital tape measure comprising a tape movable corresponding to a length of an object to be measured and on which detection marks are affixed, a detector for detecting the detection marks, a computer for computing a detection signal outputted from the detector corresponding to an amount of movement of the tape and a display for displaying a result of computation, characterized by dividing the case body into a housing for storing the tape and a housing for holding a measuring part comprising the detector, computer display, these two housings being detachably connected each other.

1 Claim, 4 Drawing Figures

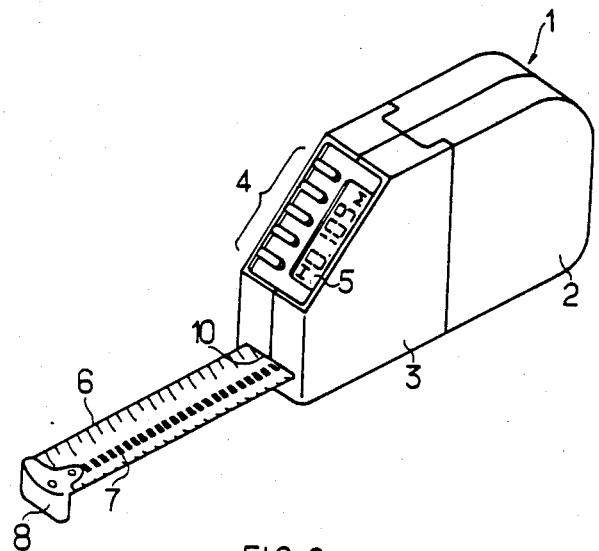
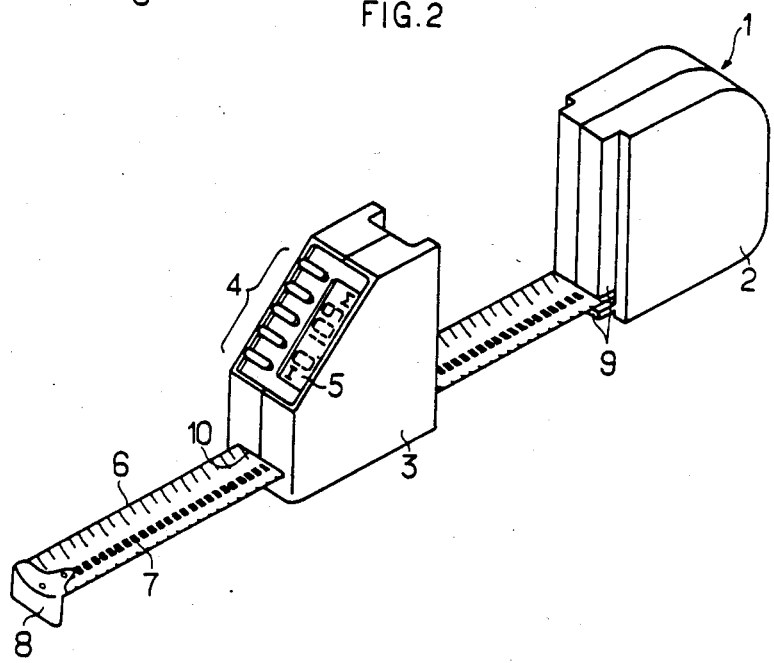

DIGITAL TAPE MEASURE

BACKGROUND OF THE INVENTION (1) Field of the Invention

The present invention relates to a digital tape measure in which a tape is built in a case body and is movable being drawn out and rewound in through an aperture of the case body, and a detected amount of movement of the tape is converted to an electric signal so that a length measured may be digitally displayed in an optional system of units.

(2) Prior Art

In a known digital tape measure in which a photographic tansfer (conversion) element is used when converting an amount of movement of a tape to an electric signal, a light is projected on marks of the tape, and by receiving a reflected light of the projected light, a detected amount corresponding to the amount of movement of the tape is counted for length measurement, it is usual that the amount of movement of the tape drawn out of the case body is measured by establishing an outlet, i.e., aperture formed on a front side of the case body as a starting point for measurement, and that photoelectric detecting means comprising a photoelectric transfer element, computing means for computing signals detected by the detecting means, and displaying means for displaying a computed result, each forming essential parts of the digital tape measure, are solidly fitted in the case body which the tape is built in.

Under such arrangement of the conventional digital tape measure, a problem exists in that a rather troublesome or intricate operation is required at the time of measuring a full length of an object to be measured with the tape stored in the case body and carrying out a further measurement for dividing the full length into several equal parts.

For example, in case that a full length of an object measured by a tape measure capable of measuring 30 m at maximum is 10.5 m and it is required to divide this full length into seven equal parts of 1.5 m each, the tape is once stored in the case body after completing the measurement of the full length and the marking for such division is carried out for every 1.5 m by moving the case body from an end portion of the measuring object.

In such operation, it is necessary to apply a tension to the tape since the tape is usually loosened when measuring a large distance, an accurate measurement being affected thereby. In the operation, as the starting point is established at the outlet of the case body, it is required to coincide the starting point with a measuring point of the full length by moving the case body back and forth while tensioning the tape itself, which is a difficult operation particularly when measuring a long (or large) distance because it is impossible to give the tension to the tape only by pulling the case body. Furthermore, unless every dividing length is measured by the tape which is in the same state of tension as the time of measuring the full length, a total length of each divided parts is not coincident with the full length.

Thus, according to the known digital tape measure, since such means as photoelectric detecting means are fitted in the case body and the amount of movement of the tape is detected by establishing the outlet for drawing out the tape as a starting point for measurement, a measurable length is limited to a length between the outlet and an end of the tape, and as a result the measuring method is restricted either to a measurement by fixing the case body while moving the tape or to a measurement by fixing the end of tape while moving the case body, thus being impossible to solve the above-discussed problem.

SUMMARY OF THE INVENTION

It is therefore an object of the present invention to provide a novel digital tape measure wherein a starting point can be established at any position on a tape drawn out so as to enable a length measurement for general purpose or with versatility.

The foregoing object is accomplished by providing a digital tape measure comprising a tape stored in a case body when it is not used and drawn out of the case body through an aperture thereof to be movable corresponding to a length of an object when it is used and on a surface of which detection marks are affixed, detecting means for detecting each of said detection marks, computing means for computing a detection signal outputted from the detecting means corresponding to an amount of movement of the tape, and displaying means for displaying a result of computation obtained by the computing means, characterized by dividing said case body into a housing for storing the tape (hereinafter referred to as "tape storing housing") and a housing for holding a measuring part (hereinafter referred to as "measuring part holding housing") in which said detecting means, computing means and displaying means are fitted and through which said tape passes, said housings being detachably connected each other.

Since the digital tape measure according to the present invention is characterized in that the case body is divided into the tape storing housing and the measuring part holding housing comprising the detecting means for detecting the amount of movement of the tape establishing the outlet for drawing out the tape as a starting point, the displaying means for displaying the detected result and through which the tape passes, both housings being detachably connected each other as above described, it is possible to measure a full length of an object establishing the aperture of the case body as the starting point, i.e., in the quite same manner as known digital tape measures, and it is further possible to move separately the measuring part holding housing from any position on the tape, by positioning this housing at an optional position on the tape, establishing the aperture of this housing as a starting point so that a moved distance is displayed as a dividing length in the full length of the object.

In this manner, according to the digital tape measure of the present invention, not only a full length of an object can be measured by collectively using the measuring part holding housing and the tape storing housing as one unit, but also the former (the measuring part holding housing) can be separately moved under the same tension as the tape at the time of measuring the full length. In this case, since the aperture of this measuring part holding housing is established as the starting point, a length measurement for division can be carried out under the same condition as the measurement of full length. Furthermore, since it is possible to establish optionally the starting point by positioning the measuring part holding housing at any position on the tape irrespective of the position of the tape storing housing, a versatility in length measurement can be successfully attained.

Other features and advantages of the present invention will become apparent in the course of the following description toegther with the accompanying drawings.

BRIEF DESCRIPTION OF THE DRAWINGS

In the drawings forming a part of this application and in which like parts are designated reference numerals throughout the same, FIG. 1 is a perspective view of an appearance of a digital tape measure as an embodiment of the present invention;

FIG. 2 is a perspective view for explanation of characteristic thereof; and

DESCRIPTION OF THE PREFERRED EMBODIMENTS

Figure 3:
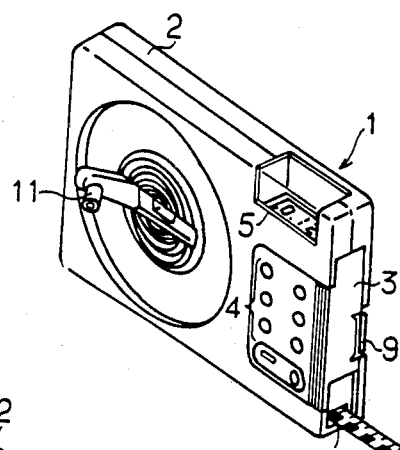
FIGS. 3 and 4 are perspective views showing another embodiment.

Referring now to the accompanying drawings, several preferred embodiments of the present invention are described in detail hereunder.

In FIG. 1 showing an appearance of a digital tape measure as an embodiment of the present invention, a case body (1) of the digital tape measure comprises a tape storing housing (2) wherein an end of a tape (6) is connected with a spiral spring and stored being wounded on a reel not shown, and a measuring part holding housing (3) comprising detecting means for detecting a detection mark (7) affixed to the tape (6) by a photographic transfer (or conversion) element establishing an outlet (10) through which the tape is drawn in and out as a starting point for length measurement, computing means for computing an amount of movement of the tape (these two means are not shown), displaying means (5) for displaying a computed result and a group of control keys (4). The measuring part holding housing (3) is detachably connected with the tape storing housing (2) through a coupling portion (9). When the tape storing housing (2) and the measuring part holding housing (3) are used as one unit, the digital tape measure represents its appearance as shown in FIG. 1, which is quite the same as known digital tape measure. In such manner of use, the tape (6) is either drawn out through the outlet (10) or a hook (8) attached to an end of the tape (6) is fitted to an object to be measured for moving the case body (1), then number of detection marks (7) on the tape (6) is detected as an amount of movement of the tape, and the detected result is displayed on the display unit (5).

FIG. 2 is a perspective view showing that the measuring part holding housing (3) is separable from the tape storing housing (2) of the case body (1) for slidable movement on the tape (6). Since the measuring part storing housing (6) can be independently or separately moved on the tape (6) in this way, it is easy to carry out a length measurement for dividing a full length into several equal parts. That is, after measuring the full length in the coupled state shown in FIG. 1, the measuring part holding housing (3) is moved toward an end portion of the tape drawn out and a marking is given to the object establishing the outlet (10) as a starting point when the displaying means display a required dividing length. At this stage, the displayed length is reset by the control keys (4), and the measuring part holding housing (3) is further moved establishing the marked point as a starting point and thereafter the same marking operation is repeated up to completion of the length division. In this connection, when measuring the full length, it is preferred that the tape is drawn out longer than the full length of the object and that the measuring part holding housing (3) is moved on so as to coincide the starting point with the actual measuring position.

Figure 4:
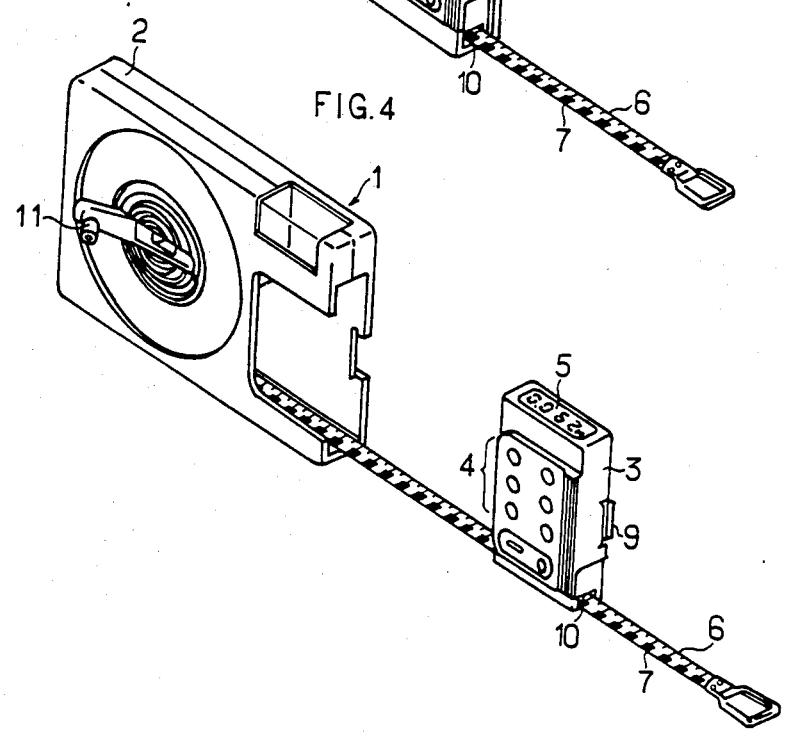

In another embodiment shown in FIGS. 3 and 4, the measuring part holding housing (3) is designed to be built in the tape storing housing (2), and the tape drawn out is manually rewound by using a rewinding handle (11). When measuring a full length as usual, the tape storing housing (2) and the measuring part holding housing (3) are used as one unit with the latter mounted on the former as shown in FIG. 3, and when carrying out a length measurement for division, the measuring part holding housing (3) is separately moved on the tape drawn out for easy operation.

It should be understood that the foregoing description relates to only preferred embodiments of the present invention, and that it is intended to cover all changes and modifications of the example of the invention herein chosen for the purposes of the disclosure, which do not constitute departures from the spirit and scope of the present invention.

What is claimed is:

1. A digital tape measure comprising a tape stored in a case body when it is not used and drawn out of the case body through an aperture thereof to be movable corresponding to a length of an object to be measured when it is used and on the surface of which detection marks for length measurement are affixed, detecting means for detecting said detection marks on the tape, computing means for computing a detection signal outputted from the detecting means corresponding to an amount of movement of the tape, and displaying means for displaying a result of computation obtained by the computing means, characterized by dividing the case body into a housing for storing the tape and a housing for holding a measuring part in which said detecting means, computing means and displaying means are fitted and through which said tape passes, said housings being detachably connected each other.

* * * * *